United States Patent [19]

Gensini et al.

[11] Patent Number: 5,543,602

[45] Date of Patent: Aug. 6, 1996

[54] METHOD FOR THE STORAGE AND CONTROLLED SUPPLY OF ELECTRIC ENERGY FOR DISCONTINUOUS LOADS IN STEELWORKS

[75] Inventors: Gianni Gensini, S. Stefano Di Buia; Giovanni Coassin, Pordenone, both of Italy

[73] Assignee: Danieli & C. Officine Meccaniche SpA, Buttrio, Italy

[21] Appl. No.: 238,497

[22] Filed: May 5, 1994

[30] Foreign Application Priority Data

May 17, 1993 [IT] Italy .................. UD93A0085

[51] Int. Cl.⁶ .................................. H05B 1/02
[52] U.S. Cl. .............. 219/491; 219/485; 219/486; 219/494; 307/48; 307/59
[58] Field of Search ........................ 219/491, 498, 219/497, 501, 481, 485, 486; 307/46, 48, 59, 80

[56] References Cited

U.S. PATENT DOCUMENTS

| | | | |
|---|---|---|---|
| 3,257,603 | 6/1966 | Laube | 321/10 |
| 3,599,073 | 8/1971 | Wilson et al. | 320/39 |
| 4,176,542 | 12/1979 | Redding | 73/23.1 |
| 5,036,181 | 6/1991 | Fishman | 219/497 |

FOREIGN PATENT DOCUMENTS 0505082   3/1992   European Pat. Off. .

OTHER PUBLICATIONS

Technische Rundschau, vol. 84, No. 34, Aug. 21, 1992, Bern, pp. 54–959 XP311531 Steffens "batterien als kleinkraftwerke".
19th Annual IEEE Power Electronics Specialists Conference vol. 1, Apr. 11, 1988, pp. 342–347, Masada et al.

*Primary Examiner*—Mark H. Paschall
*Attorney, Agent, or Firm*—Antonelli, Terry, Stout & Kraus

[57] ABSTRACT

Method for the storage and controlled supply of electric energy for discontinuous loads in steelworks and in particular for metal melting systems and rolling mills, the method comprising at least one main supply line (18) connected to a main supply source (11) of electric energy and a plurality of loads (12-13-14-114-20), whereby the level of maximum active power supplied by that main supply source (11) to the steelworks is limited by a sub-station (27) to a level "$P_0$" lower than the peaks of maximum absorption by those loads (12-13-14-114-20), the method comprising at least one accumulation line (16) connected in parallel to the main supply line (18) and supplying at least one storage assembly (17), which is connected to the loads (12-13-14-114-20) through a secondary supply line (19).

6 Claims, 2 Drawing Sheets

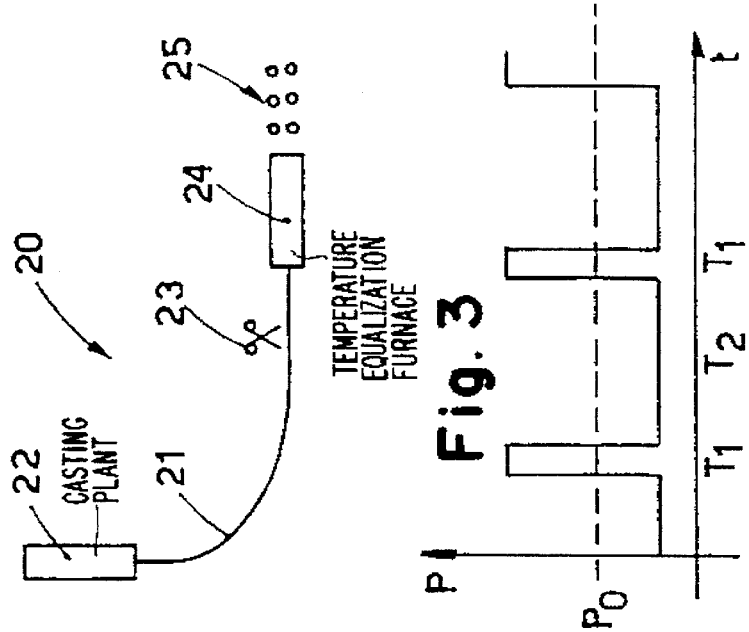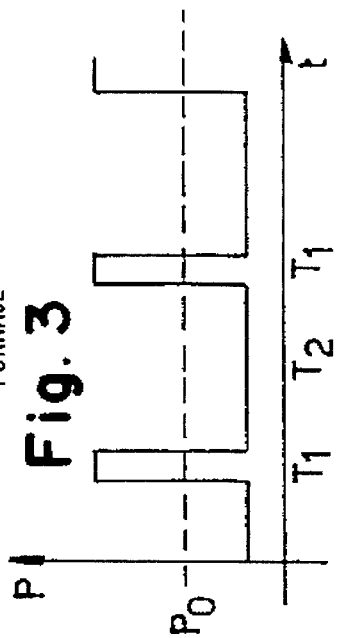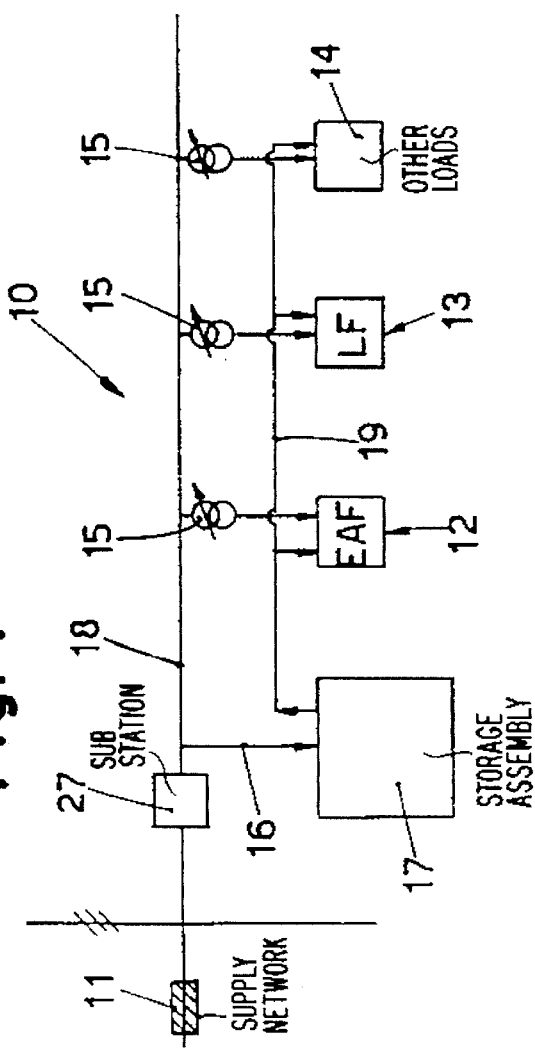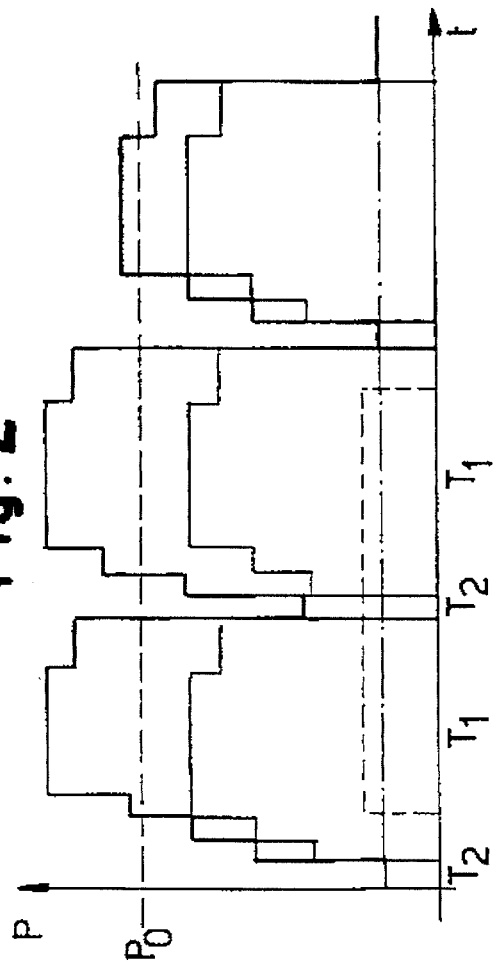

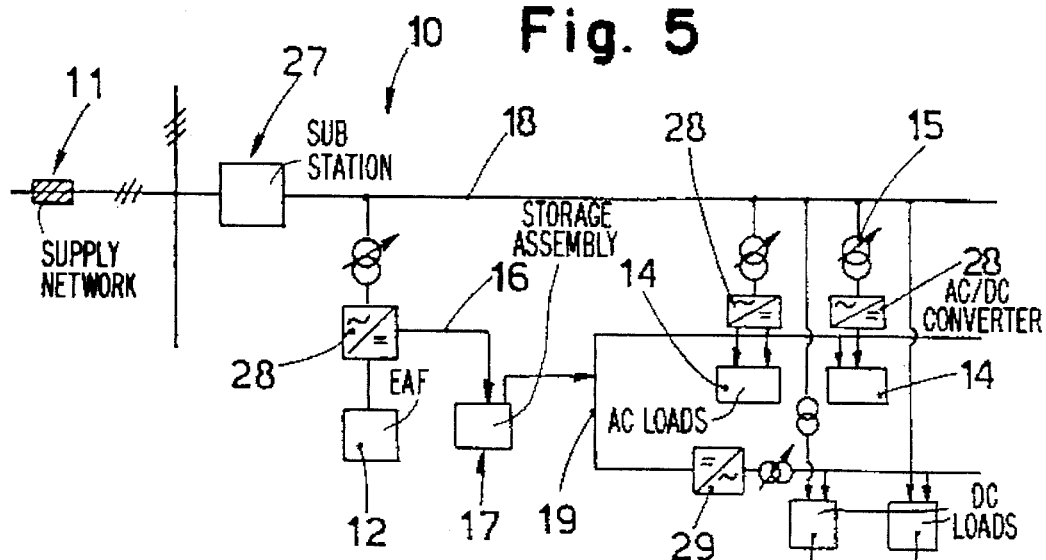
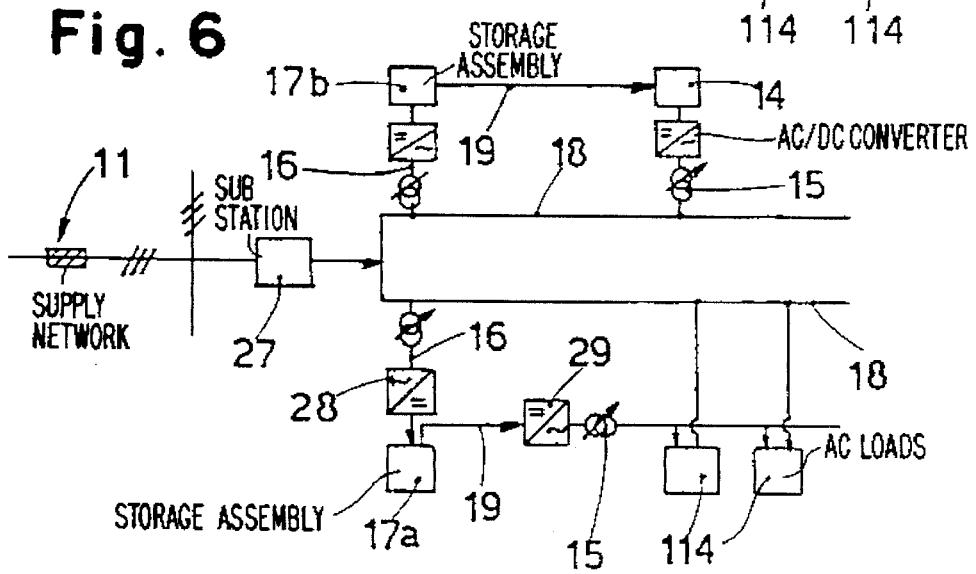
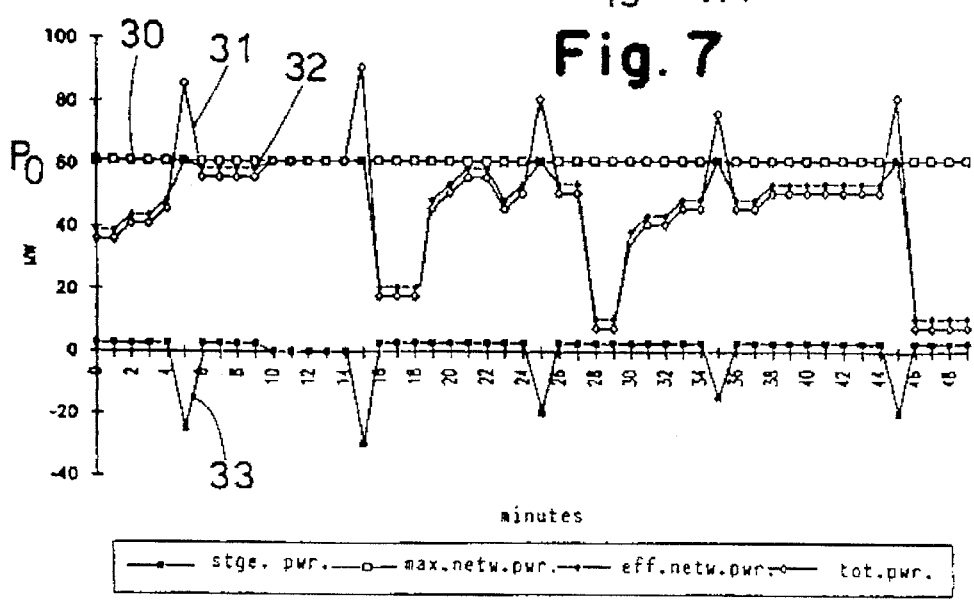

METHOD FOR THE STORAGE AND CONTROLLED SUPPLY OF ELECTRIC ENERGY FOR DISCONTINUOUS LOADS IN STEELWORKS

BACKGROUND OF THE INVENTION

This invention concerns a method for the storage and controlled supply of electric energy for discontinuous loads in steelworks.

To be more exact, the method according to the invention provides for the reduction of power peaks absorbed from the electrical supply network according to the highly variable conditions of load and of working of the devices functioning in the steelworks, especially as regards electric furnaces and rolling mills.

One of the most important problems encountered in steelworks relates to the supply of electric energy by the supplying Authority.

It is known that the very high power required for the working of the various devices is faced with the limited power of the electricity lines and with the Authority's requirement to have a constant load in those lines.

This entails for the steelworks the burden of particularly harsh contracts, since electric furnaces in particular have in their various working steps very variable conditions of load requiring peaks of active power much higher than the mean absorbed power.

In fact, the typical working cycle of electric furnaces is characterised by a considerable variability and discontinuity of the value of the absorbed electrical power.

A steel melting furnace changes typically from a maximum value of absorbed power, when it is engaged in the melting step, to a substantially zero absorption during the step of tapping and of charging scrap.

In some intermediate working steps, such as perforation for instance, the furnace has a given absorption which is less than the maximum value.

The inclusion of a ladle furnace for secondary metallurgy, even if it requires power much less than that required by a melting furnace, contributes to the worsening of the situation inasmuch as the ladle furnace absorbs the maximum power for a shorter period than the cycle of the melting furnace.

Where there are common rolling mills for the production of strip and wide flats, it is known that the slab leaving the continuous casting plant is generally sheared to size in segments which are then sent to the rolling mill stands.

This method entails very high peaks of power when the rolling mill stands start working, these peaks lasting for a very short time; this involves the installation of electric lines able to withstand these peaks.

So as to avoid this problem, all steelworks normally employ the technique of restricting costs by using a lower power than that required and install plant to measure and predict the energy consumption during the period required by the supplying Authority to provide the higher power.

If the consumption of energy in that period exceeds the foreseen consumption, the load is reduced by stopping the electric furnace, rolling mill or usage means involved at that moment. This is an especially damaging shortcoming for the ideal working of the plant.

SUMMARY OF THE INVENTION

So as to be able to keep constant the mean power supplied and to be able to meet the maximum peaks of power due to the specific load and/or working conditions, the present applicants have studied, tested and obtained this invention.

The method for the storage and controlled supply of energy for discontinuous loads according to the invention arranges an accumulation line in parallel with the main supply line; the accumulation line is suitable to store electric energy from the main supply line during all the steps in which the usage means work at low power and especially during plant downtimes.

This electric energy is returned and supplied in situations where the usage means require and absorb maximum power.

Thus the value of maximum power absorbed from the supply network can be restricted to a level lower than the level of power absorbed during the peaks of maximum absorption.

This maximum power value required by the loads from the network can be suitably calculated according to the momentary proportions between the steps of maximum absorption and the steps of low absorption by the usage means and possibly according to the duration of the programmed machine downtimes.

This enables the plant supplying the loads to be adequately sized by avoiding overcapacity of the lines and by keeping substantially constant the power absorbed from the supply network.

This leads also to elimination of a series of shortcomings caused in the network by the presence of the peaks of power absorbed by the load.

The fact of stabilization of the load and of absorbing from the supply network a given constant level of power, in fact, enables flicker in the network and harmonics produced by the furnace to be reduced; it also enables high reactive component of the power supplied to be reduced in view of the strongly inductive characteristics of the load, particularly in the case of an electric furnace; lastly, it enables a substantially constant fall in the voltage due to the load to be maintained.

The method for the storage and controlled supply according to the invention works especially well in the event of loads having modest overcurrents, that is to say, in the event of use of DC electric furnaces or furnaces equipped with regulation components such as saturable reactor on the furnace supply line.

BRIEF DESCRIPTION OF THE DRAWINGS

The attached figures are given as a non-restrictive example and show some preferred lay-outs of the invention as follows:

FIG. 1 is a block diagram of the method of storage of electric energy according to this invention;

FIG. 2 shows a typical absorption of active power in the case of a melting furnace;

FIG. 3 shows a typical absorption of active power in the case of a rolling mill;

FIG. 4 is a diagram of a rolling plant;

FIG. 5 is a variant of the lay-out of FIG. 1;

FIG. 6 shows another variant of the lay-out of FIG. 1;

FIG. 7 shows the momentary developments of the power and energies involved in an example of the method according to this invention.

DETAILED DESCRIPTION OF THE PREFERRED EMBODIMENTS

The method for the storage and controlled supply 10 of electric energy according to the invention is shown with a block diagram in FIG. 1. The electric power absorbed from a supply network 11, which is restricted to a maximum given value "$P_0$" (FIGS. 2, 3 and 7) in a sub-station or in a transformer room 27, is distributed through respective transformers 15 to all the connected usage means, which in this case are represented by an electric furnace 12, a ladle furnace 13 and other connected loads indicated generically with 14.

These loads have an extremely discontinuous level of absorption of active power according to the operating conditions which take place during the cycle.

FIG. 2 in particular shows the typical development of the absorption of active power by a metal melting system.

The continuous line indicates the active power absorbed by the melting furnace 12, while the dashed line of dashes shows the active power absorbed by the ladle furnace 13 and the dotted and dashed line shows the active power absorbed by the remainder of the load 14.

The bold-face line indicates the overall active power obtained by the addition of the individual active powers of the various loads.

As can be seen in FIG. 2, the absorption of active power can vary a great deal and comprises zones referenced with "T2" of very low absorption and other zones referenced with "T1" characterised by peaks of maximum absorption.

According to the invention at least one power accumulation line 16 is provided in parallel with a main supply line 18 and feeds a storage assembly 17, which may comprise at least one transformer/converter assembly, an assembly of batteries or accumulators and at least one system to regulate the distribution of the flow of energy.

This storage assembly 17 enables the plant to absorb from the supply network 11 a substantially constant level of active power "$P_0$" at a value lower than the corresponding peaks of maximum power absorbed during the various steps of the working cycle. The capacity of the supply plant can therefore be reduced, the supply voltage can be stabilized and the level of delivered power can be kept constant.

During all of the time while the loads absorb less power than the maximum supply power "$P_0$" the storage assembly 17 is charged by accumulating energy from the main supply line 18.

When the absorption by the loads exceeds the maximum active power level "$P_0$" required of the supply network, the storage assembly 17 undertakes the task of a complementary supply source through a secondary supply line 19.

According to the variant of FIG. 5, if the furnace 12 is a DC furnace, the accumulation line 16 is applied at the output of the AC/DC converter 28 of the furnace 12, thus making use of the conversion carried out by the converter 28.

The secondary supply line 19 leaving the storage assembly 17 thus supplies, when necessary, a plurality of loads, namely DC loads 14 directly in this case and the AC loads 114 after conversion carried out by the DC/AC converter 29.

The situation shown in FIG. 6 includes two main supply lines 18 and two accumulation lines 16, which supply two separate storage assemblies 17a and 17b respectively.

The first storage assembly 17a is pre-arranged for the secondary supply line 19 of AC loads 114, whereas the second storage assembly 17b is pre-arranged for the secondary supply line 19 of DC loads.

This lay-out enables the storage assemblies 17 to be of a suitable capacity according to the specific requirements of the usage means to which they feed the secondary supply.

The storage assembly 17 is governed by a regulation system, controlled by a software unit for instance, so that the variations in the state of the storage assembly 17 can be determined and regulated.

FIG. 3 is a graph relating to the absorption of active power in the case of a rolling mill 20, which is shown diagrammatically in FIG. 4. In this case a slab 21 leaving a continuous casting plant 22 is cut into segments by shears 23; these segments are then fed through a heating and temperature equalization furnace 24 and are accelerated by rolling mill stands 25.

The rolling steps entail absorption peaks of a short duration but of a value considerably greater than the value of the mean power absorbed by the plant.

FIG. 3 is a graph to illustrate this solution, in which the intervals referenced with "Ti" correspond to the peaks of maximum absorbed power, whereas the intervals referenced with "T2" correspond to the normal phases of absorption of power.

The use of the storage and controlled supply method 10 according to the invention enables a maximum network supply equal to "$P_0$" to be employed which is able to feed the storage assembly 17 during the intervals "T2", and this storage assembly 17 thus forms a supply complementary to the main supply line 18 during the intervals "T1".

FIG. 7 shows some momentary developments of powers and energies involved in the storage and controlled supply method in a possible example concerning real components connected to a possible electric furnace. The line 30 indicates the maximum supply network output, which in this case is about 60 MW, whereas the line 31 indicates the overall power employed by the loads of the steelworks and the line 32 indicates the actual power delivered by the supply network.

In the intervals when the power employed by the loads is less than the maximum power supplied by the supply network, the supply network charges the storage assembly 17 according to the specific charging requirements of that assembly 17.

The line 33 shows a possible development of a storage assembly 17 and indicates how a maximum constant value of about 3 MW can be fed to that assembly 17.

When the overall power required by the loads exceeds the maximum power of the supply network (line 31-intervals 4–6, 14–16, etc.), the storage assembly 17 takes part as a secondary source of supply and discharges.

The storage assembly 17 has a maximum discharge power which depends on the maximum charging power and the parameters of real functioning such as the energy efficiency of the storage assembly 17, the charging/discharging times, the efficiency of the converters and of the other connected components, etc.

In selecting the maximum power required from the supply network "$P_0$" and in selecting the capacity of the storage assembly 17 it will be necessary to include a safety margin of about 10–20% for instance between the estimated value of peaks of power and the maximum power which can be delivered by the supply network plus the storage assembly 17.

The storage assembly 17 will have a condition at the start of a cycle with a value of stored energy of "$E_0$" for instance and, under ideal working conditions, will return to that value "$E_0$" at the end of the working cycle.

If the energy stored at the end of the cycle is less than "$E_0$", then during the next cycle it will be necessary to increase the value of "$P_0$" delivered by the supply network.

In the opposite case, when the energy stored at the end of the cycle is greater than "$E_0$" then the value of "$P_0$" can instead, be reduced.

We claim:

1. Method for the storage and controlled supply of electric energy for a plurality of discontinuous loads in a steelworks comprising:

providing at least one main supply line connected to main supply source of electric energy and to the plurality of discontinuous loads;

limiting a level of maximum active power supplied by the main supply source to the steelworks by a sub-station to a level P0 lower than peaks of maximum absorption by the plurality of discontinuous loads;

providing at least one accumulation line connected to the main supply line for supplying electric energy limited in magnitude by the sub-station for storage by at least one storage assembly which is connected to the plurality of discontinuous loads through a secondary supply line; and providing stored electric energy from the storage assembly through the secondary supply line to the plurality of discontinuous loads when the plurality of discontinuous loads are drawing electric energy above the level P0.

2. Method as in claim 1, whereby the storage assembly has a first condition, which takes place when the overall absorption by the loads connected to the main supply source (11) is less than the level "$P_0$" of maximum power which can be absorbed from that main supply source, and a secondary condition, which takes place when the overall absorption by the loads connected to the main supply source is greater than the level "$P_0$" of maximum power which can be absorbed from that main supply source.

3. Method as in claim 1, whereby the secondary supply line feeds the loads directly through its own output transformer.

4. Method as in claim 1, whereby the accumulation line includes a transformer and at least one converter system associated with plurality of discontinuous loads.

5. Method as in claim 1, whereby a plurality of storage assemblies are included and have a capacity according to the specific requirements of a load connected thereto.

6. Method as in claim 1, whereby the level "$P_0$" is so calculated that the energy stored in the storage assembly has at all times a value of 10–20% in relation to the condition of maximum stored energy.

* * * * *